United States Patent Office 2,868,854
Patented Jan. 13, 1959

2,868,854
HF—BF₃ ISOMERIZATION OF POLY-SECONDARY ALKYLBENZENES

Arthur P. Lien, Highland, Ind., and David A. McCaulay, Chicago, Ill., assignors to Standard Oil Company, Chicago, Ill., a corporation of Indiana No Drawing. Original application October 30, 1953, Serial No. 389,328. Divided and this application June 8, 1956, Serial No. 590,104

11 Claims. (Cl. 260—668)

This invention relates to the rearrangement of certain secondary alkylbenzenes. More particularly the invention relates to the disproportionation of isopropylbenzene and secondary butylbenzene. Still more particularly the invention relates to the production of essentially pure meta di-isopropylbenzene and 1,3,5-tri-isopropylbenzene.

The development of the hydroperoxide synthesis for phenol has resulted in a demand for secondary alkylbenzenes. Since certain phenols have particularly desirable properties for use as chemical intermediates, a demand has arisen for large quantities of various secondary alkylbenzenes of high purity, i. e., about 95%, and also essentially pure, i. e., 99%, compounds. Of particular interest are meta di-isopropylbenzene and 1,3,5-iso-propylbenzene. The production of di-isopropylbenzene by the alkylation of benzene with propylene produces a mixture of the three isomers; therefore, industry is concerned with the preparation of high purity individual isomers in high yield.

It is an object of this invention to prepare di-secondary alkylbenzenes by the treatment of isopropylbenzene or secondary butylbenzene. Another object is the production of tri-secondary alkylbenzene by the treatment of the corresponding secondary alkylbenzene or di-secondary alkylbenzene. Still another object is a process for the conversion of secondary alkylbenzene to high purity meta di-secondary alkylbenzene without simultaneously producing any significant amount of tri-secondary alkylbenzene.

Yet another object of the invention is a process for the production of high purity meta di-secondary alkylbenzene from a feed containing at least one of the other isomers or mixtures of the meta isomer and substantial amounts of the other isomers. A further object is a process for the preparation of high purity meta di-secondary alkylbenzene without the simultaneous production of significant amounts of tri-secondary alkylbenzenes. A specific object is the preparation of essentially pure meta di-isopropylbenzene by the treatment of a mixture of di-isopropylbenzene isomers without simultaneously producing any appreciable amount of tri-isopropylbenzenes. Other objects will become apparent in the course of the detailed description of the invention.

DISPROPORTIONATION

In this process, a secondary alkylbenzene selected from the class consisting of isopropylbenzene and secondary butylbenzene is contacted, under substantially anhydrous conditions and in the substantial absence of reactive hydrocarbons with at least an effective amount of $BF_3$, preferably about 1 mol per mol of sec-alkylbenzene, and an amount of liquid HF at least sufficient to form a distinct acid phase, preferably between about 5 to 20 moles per mole of sec-alkylbenzene; the contacting is carried out at a temperature between about $-30°$ C. and about $+80°$ C. for a time at least sufficient to permit an appreciable amount of rearrangement reaction; the HF and $BF_3$ are removed from the acid phase in order to recover poly-secondary alkylbenzene.

By operating for a sufficiently short time at a temperature between about $-30°$ C. and about $-5°$ C., production of tri-secondary alkylbenzene can be essentially eliminated. Operation at temperatures below about $-30°$ C. substantially halts the disproportionation reaction.

The charge to the disproportionation process contains secondary alkylbenzenes selected from the class consisting of isopropylbenzene and secondary butylbenzene. In order to obtain products containing only one particular alkyl substituent, the feed must contain essentially only either isopropylbenzene or secondary butylbenzene as the reactive component.

In addition to the secondary alkylbenzene, the feed may contain non-reactive liquid hydrocarbons. It is to be understood that the term "non-reactive liquid hydrocarbons" is intended to mean those hydrocarbons which are liquid at operating conditions and which are inert to the action of the HF—$BF_3$ agent and do not participate in any reaction with the secondary alkylbenzene charged. Examples of reactive hydrocarbons are olefins, xylene, diethylbenzene, ethyltoluene, ethylbenzene and isopropyltoluene. Examples of non-reactive hydrocarbons are: Isopentane, butane, and hexane. It is preferred that benzene be absent from the feed as its presence has an adverse effect on the degree of disproportionation obtained.

The process utilizes substantially anhydrous liquid hydrogen fluoride. The liquid hydrogen fluoride should not contain more than about 2 or 3% of water. Commercial grade anhydrous hydrogen fluoride acid is suitable for this process.

Under the conditions of the process, polyalkylbenzenes form a complex containing 1 mole of $BF_3$ and, it is believed, 1 mole of HF per mole of polyalkylbenzene. Therefore, at least enough liquid HF must be present to participate in the formation of the complex with the poly-secondary alkylbenzene; in addition to this amount, sufficient liquid HF must be present to dissolve the complex which has been formed. In general, the presence of a distinct separate acid phase in the contacting zone indicates that at least the minimum requirement of liquid HF has been met. More than this minimum amount of liquid HF is desirable. Usually between about 3 and 50 moles of liquid HF are utilized per mole of secondary alkylbenzene charged to the process. It is preferred to operate with between about 5 and 20 moles of liquid HF per mole of secondary alkylbenzene charged.

The process requires the presence of at least an amount of boron trifluoride sufficient to cause a rearrangement reaction to take place, specifically the disproportionation of the secondary alkylbenzene to poly-secondary alkylbenzene. While amounts of $BF_3$ as small as 0.1 mole per mole of secondary alkylbenzene charged will cause an appreciable amount of rearrangement reaction to take place, it is desirable to operate with about 0.3 mole of $BF_3$. Still more $BF_3$ has a beneficial effect on the degree of the rearrangement reaction and as much as 5 or more moles may be used. When high purity meta di-secondary alkylbenzene is a desired product, at least 0.5 mole of $BF_3$ should be used per mole of secondary alkylbenzene charged, and it is preferred to use between about 1 and about 2 moles of $BF_3$ per mole of secondary alkylbenzene charged, for example, 0.9 mole.

When the feed to the process contains poly-alkylbenzenes in addition to the secondary alkylbenzene, 1 mole of $BF_3$ should be used per mole of said poly-alkylbenzene, in addition to that set out above.

The process may be operated with two liquid phases present in the contacting zone. At high $BF_3$ usages, a gas phase may also be present in the contacting zone. The two liquid phases will be spoken of herein as the raffinate phase and the acid phase. The acid phase consists of liquid HF, BF$_3$, complex and physically dissolved hydrocarbons. The raffinate phase may be secondary alkylbenzenes in excess of that amount taken into the acid phase, or may be a mixture of secondary alkylbenzene and inert hydrocarbons, or may be principally inert hydrocarbons. In the absence of substantial amounts of inert hydrocarbons, the amount of raffinate phase is dependent upon the amount of BF$_3$ utilized. When using at least about 0.5 mole of BF$_3$ per mole of secondary alkylbenzene, and in the substantial absence of inert hydrocarbons, all or virtually all the secondary alkylbenzene will be taken into the acid phase either in the form of a complex or in solution. The presence of HF—BF$_3$-poly-alkylbenzene complex in liquid HF very greatly increases the solubility of the liquid HF for aromatic hydrocarbons and increases slightly the solubility of paraffinic hydrocarbons.

The presence of a raffinate phase consisting principally of inert hydrocarbons, such as benzene and paraffins, has an adverse effect on the degree and direction of conversion of the secondary alkylbenzene charged, even though theoretically sufficient BF$_3$ is present to complex all of the poly-secondary alkylbenzene formable from the secondary alkylbenzene charged. A substantial amount of the secondary alkylbenzene will remain in the raffinate phase, even when using somewhat more than 0.5 mole of BF$_3$ per mole of secondary alkylbenzene charged. The secondary alkylbenzene in the raffinate phase does not undergo a rearrangement reaction to any significant extent, even under conditions of good agitation. The presence of dissolved inert hydrocarbons in the acid phase does not appear to have any adverse effect on the degree or direction of the rearrangement reactions.

In order to maximize the yield of conversion products, and to produce a di-secondary alkylbenzene product fraction consisting essentially of 1,3-di-secondary alkylbenzene, i. e., the meta isomer, it is preferred to operate under conditions which form a single essentially homogeneous liquid phase in the contacting zone. A single essentially homogeneous liquid phase is attainable with a feed containing as much as three volume percent of paraffinic hydrocarbons. Large amounts of benzene may be dissolved in the acid phase, as much as 1 mole or more, per mole of complexed polyalkylbenzene, depending on the amount of complex in the acid phase. (It is to be understood that a separate gaseous BF$_3$ phase may also be present, but it is preferred that a minimum of free space be present in the contacting zone and that sufficient pressure be maintained to insure that essentially all the BF$_3$ is either in the complexed form or is in physical solution in the acid phase.)

The degree and direction of the disproportionation reaction are also determined by the temperature of contacting and the time of contacting; a definite relationship exists between the temperature, time and desired disproportionation products. At temperatures below about —40° C. no appreciable disproportionation takes place even at contacting times of several hours. At temperatures of about +100° C., side reactions such as cracking occur and the direction of the disproportionation changes; gas and a wide boiling range product mixture are obtained. The practical upper limit for the operation of the disproportionation process is about +80° C. Appreciable amounts of disproportionation product are obtained in a not excessively long time at a temperature of about —30° C. The preferred range of operating temperatures for the disproportionation process is between about —20° C. and about +60° C.; wherein the time of contacting is between about 5 minutes and 24 hours, the longer times corresponding to the lower temperatures.

The contacting time has an important effect on the course of the rearrangement reactions. At least sufficient time must be provided at the particular temperature of operation in order to obtain an appreciable amount of disproportionation products. As the contacting time is increased, at a constant temperature, the amount of disproportionation product increases. The disproportionation reaction appears to produce the di-secondary alkylbenzene as the first product. Dependent upon the temperature, a finite period of time elapses between the appearance of detectable amounts of the di-secondary alkylbenzene product and the appearance of the tri-secondary alkylbenzene product. The lower the temperature of operation, the longer the time lapse between the appearance of the di-derivative and the appearance of the tri-derivative.

With increasing contacting time, at constant temperature, the amount of tri-secondary alkylbenzene product gradually increases at the expense of di-secondary alkylbenzene formed. Gradually the amount of the tri-derivative increases and eventually the tri-derivative continues to increase with simultaneous disappearance of the di-derivative. At higher temperatures and prolonged contacting times, the reaction product mixture contains the tri-derivative as the predominant disproportionation reaction product. However, even at +80° C. and prolonged contacting times, some secondary alkylbenzene and some di-secondary alkylbenzene will be found in the reaction product mixture. Thus by adjusting the temperature and time of contacting, it is possible to control the relative amounts of di- and tri-derivatives produced in the disproportionation process.

The disproportionation reaction can be controlled, within experimental error, to produce di-secondary alkylbenzene as essentially the only poly-secondary alkylbenzene product. When the di-secondary alkylbenzene is the only desired poly-secondary alkylbenzene disproportionation product, the contacting temperature should not exceed about —5° C. The lower temperature of operation is about —30° C.

The contacting time at —5° C. must be short enough to essentially eliminate the disproportionation to the tri-derivative. At about —5° C. the permissible maximum time of contacting is about 15 minutes to essentially avoid the formation of the tri-derivative. The lower the temperature of contacting, the longer the contacting time permissible for avoiding the formation of detectable amounts of the tri-derivative. At about —20° C. contacting temperature, the permissible maximum time is on the order of 6 hours; at about —30° C., the permissible maximum contacting time is on the order of a day or more. Thus in order to avoid the formation of appreciable amounts of tri-secondary alkylbenzene, the disproportionation process must be carried out at a temperature of about —5° C., for a maximum contacting time of about 15 minutes. The lower the temperature of contacting, the longer will be the corresponding permissible maximum contacting time.

Even when using smaller amounts of BF$_3$, the predominant di-secondary alkylbenzene product is the 1,3-di-secondary alkylbenzene, i. e., the meta isomer. The use of 0.5 mole of BF$_3$ and preferably about 1 mole, gives essentially pure 1,3-di-secondary alkylbenzene as the di-secondary alkylbenzene product. By careful control of the contacting time, it is possible to produce a di-secondary alkylbenzene product fraction which is, within the error of the analytical procedure, pure 1,3-di-secondary alkylbenzene.

Under the conditions of operation described above, the tri-derivative is essentially pure 1,3,5-tri-secondary alkylbenzene, i. e., the symmetrical configuration.

When the charge to the disproportionation process described above is a secondary alkylbenzene selected from the class consisting of isopropylbenzene and secondary butylbenzene, the reaction product mixture contains relatively large amounts of the di-secondary alkyl derivative even though high temperatures and long contacting times are used. When it is desired to maximize the yield of the tri-secondary alkylbenzene product fraction, to charge to the disproportionation process should be the corresponding di-secondary alkylbenzene. The use of an isomer or a mixture of isomers of di-secondary alkylbenzene which are selected from the class consisting of di-isopropylbenzenes and di-secondary butylbenzene as the charge to a disproportionation process, wherein sufficient liquid HF and $BF_3$ are used to form a single essentially homogeneous phase, at a temperature between about $-20°$ and $+60°$ C. for a suitable contacting time, results in a reaction product mixture wherein the di-secondary alkylbenzene forms only a minor part of the reaction product mixture. In the process wherein the di-derivative is the charge, it is preferred to use at least 1 mole of $BF_3$ per mole of charge.

When the charge to the di-secondary alkylbenzene disproportionation process consists of mixtures of the meta isomer and at least one other isomer, which other isomer is present in substantial amounts, the acid phase contains a reaction product mixture wherein the di-secondary alkylbenzene fraction is enriched with respect to the meta isomer when compared with the charge. When operating under essentially single liquid phase conditions and with at least 1 mole of $BF_3$ per mole of di-secondary alkylbenzene charged, the reaction product mixture contains essentially pure meta di-secondary alkylbenzene as the secondary alkylbenzene component, i. e., the ortho and/or para isomers are isomerized to the meta isomer.

The disproportionation at higher temperatures of di-secondary alkyl-benzenes produces appreciable amounts of the tetra-derivative as well as the tri-derivative. Operation at lower temperatures and for short times permits holding the yield of tetra-derivative to the minimum.

However, when the tetra-derivative is the desired product, it is preferred to operate with the corresponding tri-secondary alkylbenzene as the charge to the process. Using at least 1 mole of $BF_3$ and sufficient liquid HF to form an essentially single homogeneous phase, tri-isopropylbenzene or tri-secondary butylbenzene are disproportionated at temperatures between about $+30°$ C. and about $+60°$ C. and suitable contacting times into a product mixture containing the corresponding tetra-secondary alkylbenzene as the predominant component.

The invention is limited to the HF—$BF_3$ treatment of isopropylbenzene isomers and secondary butylbenzene isomers because successful treatment of the secondary pentylbenzenes requires very different operating conditions. Even at temperatures on the order of $+20°$ C. and contacting times as short as 15 minutes, the secondary pentylbenzenes undergo rearrangement of the pentyl group and also cracking of the pentyl group. In addition, cyclization reactions occur and substantial quantities of indanes and tetralins are formed. Rearrangement of the pentyl group is particularly prominent when 3-phenyl-pentane is the charge to the HF—$BF_3$ contacting zone. The 3-phenylpentane isomerizes to give good yields of the 2-phenylpentane derivative, particularly the 2,4-bis(2-pentyl)benzene disproportionation product. Rearrangement of the pentyl group is not present to any large extent when 2-pentylpentane is the charge to the HF—$BF_3$ contacting zone. It is to be understood that by suitable adjustment of the temperature and time of contacting it is possible to minimize side reactions.

ISOMERIZATION OF POLY-DI-SECONDARY ALKYLBENZENES

The isomerization reaction considered herein is the shift of position of substituent alkyl groups on the benzene ring without rearrangement of the alkyl group itself. The isomerization process comprises contacting, under substantially anhydrous conditions and in the substantial absence of reactive hydrocarbons, a di-secondary alkylbenzene selected from the class consisting of the ortho isomer, the para isomer, and mixtures thereof with at least an effective amount of $BF_3$ and an amount of liquid HF at least sufficient to form a distinct acid phase; the contacting is carried out at a temperature of not more than about $-30°$ C. for about not more than 30 minutes; as the temperature of contacting is lowered, the permissible maximum time of contacting may be increased; and removing HF and $BF_3$ from the acid phase under conditions to substantially avoid rearrangement reactions and recovering from the reaction product mixture a di-secondary alkylbenzene fraction containing the meta isomer. A feed, containing mixtures of the meta isomer and a substantial amount of at least one of the other isomers, when treated with at least about 1 mole of $BF_3$ per mole of di-secondary alkylbenzene charged, and other conditions as given above, produces a reaction mixture enriched with the meta isomer relative to the charge to the process.

By carrying out the isomerization process in the presence of added benzene, the process may be carried out at temperature as high as about $-5°$ C. without producing appreciable amounts of disproportionation reaction products. It is preferred to use at least about 1 mole of added benzene per mole of di-secondary alkylbenzene charged.

The charge to the low temperature isomerization process contains a di-secondary alkylbenzene selected from the class consisting of the ortho isomer, the para isomer, mixtures thereof, and natural mixtures of all three isomers. When using at least about 1 mole of $BF_3$ per mole of di-secondary alkylbenzene charged, the feed may contain mixtures of the meta isomer and a substantial amount of at least 1 other isomer.

Except for the secondary alkylbenzene portion, the feed to the isomerization process may be of the same type as the feed to the disproportionation process. However, for reasons pointed out hereinafter, the presence of benzene in the feed to the isomerization process is beneficial.

The isomerization process, like the disproportionation process, utilizes substantially anhydrous liquid hydrogen fluoride. The isomerization process and the disproportionation process utilize liquid HF to the same degree.

The isomerization process requires the presence of at least an amount of $BF_3$ sufficient to cause an appreciable amount of isomerization of the ortho and para isomers to the meta isomer. While amounts of $BF_3$ as small as 0.1 mole per mole of di-secondary alkylbenzene charged cause an appreciable amount of isomerization to take place, it is desirable to operate with more than this amount, e. g., about 0.5 mole of $BF_3$. As much as 5 or more moles of $BF_3$ may be used. Increasing the amount of $BF_3$ has an extremely beneficial effect on the degree of isomerization obtained. When slightly less than 1 mole of $BF_3$ per mole of di-secondary alkylbenzene charged is used, e. g., 0.9 mole, the reaction product mixture contains high purity meta di-secondary alkylbenzene as the di-secondary alkylbenzene fraction. In order to obtain the conversion of the di-secondary alkylbenzene charged to essentially pure meta di-secondary alkylbenzene, the process is operated with between at least 1 and about 2 moles of $BF_3$ per mole of di-secondary alkylbenzene charged.

The isomerization process may be carried out with two liquid phases in the contacting zone as has been described above in the disproportionation process. However, in order to maximize the yield of the isomerization product, and to improve the purity of the desired meta di-secondary alkylbenzene, it is preferred to operate under conditions which form a single essentially homogeneous liquid phase in the contacting zone.

The isomerization reaction considered herein is the shift of position of substituent alkyl groups on the benzene ring without rearrangement of the alkyl group itself. This isomerization reaction proceeds at a much faster rate, at lower temperatures, than does the reaction wherein alkyl groups are transferred from one benzene ring to another benzene ring, i. e., disproportionation. It is possible by suitably adjusting the temperature and time of contacting to essentially avoid the formation of disproportionation products and limit the course of the rearrangement reaction to isomerization alone. (It is to be understood that the term "to essentially avoid" is intended to mean within the error of the analytical procedures now available to the art, for example, ultra-violet and infrared techniques.)

At temperatures of not more than about —20° C. it is possible, by limiting the contacting time to not more than about 30 minutes, to isomerize substantially all the ortho and/or para isomers present in the charge to the corresponding meta isomer, when at least about 1 mole of $BF_3$ is used per mole of secondary alkyltoluene charged. As the temperature of contacting is lowered, the permissible time of contacting may be lengthened without formation of appreciable amounts of the undesired disproportionation reaction products. When the process is operated at about —30° C. for a time of not more than about 5 minutes, the reaction product mixture contains essentially no disproportionation reaction products; at a $BF_3$ usage of at least 1 mole of $BF_3$ per mole of di-secondary alkylbenzene charged, and these conditions of time and temperature, essentially pure meta di-secondary alkylbenzene is obtained as the reaction product.

Obviously operation at these low temperatures and very short contacting times has a serious effect on the commercial practicality of this isomerization process. It has been found that the presence of benzene in the feed to the process has a remarkable effect on the rate at which disproportionation proceeds. The presence of substantial amounts of benzene in the charge slows down the disproportionation reaction rate to such an extent that it is possible to essentially eliminate the products of disproportionation at temperatures where substantial quantities of the tri-secondary alkylbenzene would have been formed, in the absence of added benzene.

The isomerization process can be carried out without formation of appreciable amounts of disproportionation products at temperatures of not more than about —5° C. when the charge to the process comprises essentially the defined di-secondary alkylbenzene and benzene. The amount of disproportionation products formed is dependent upon temperature, time and amount of benzene added; it is preferred to use at least about 1 mole of added benzene and preferably the maximum amount soluble in the acid phase should be used. When operating with about 1 mole of benzene in the feed per mole of di-secondary alkylbenzene present therein, the isomerization process may be carried out at about —5° C. for an about 5 minute maximum contacting time; at about 0° C. for an about 30 minute maximum contacting time, and at about —20° C. for an about 2 hour maximum contacting time. Under this relationship of temperature and time, and at least 1 mole of $BF_3$ per mole of secondary alkylbenzene charged, an essentially pure meta di-secondary alkylbenzene product is obtained, without forming any appreciable amount of the corresponding tri-secondary alkylbenzene disproportionation product.

Mixtures of the isomers or the individual non-symmetrical isomers of tri-secondary alkylbenzene are isomerized to the symmetrical configuration, i. e., 1,3,5-tri-secondary alkylbenzene. By the use of at least 1 mole of $BF_3$ per mole of tri-secondary alkylbenzene and sufficient liquid HF to form an essentially single liquid homogeneous phase and a temperature between about 0° and +30° C. and a suitably short time, it is possible to obtain essentially pure 1,3,5-tri-secondary alkylbenzene as the reaction product, to the essential exclusion of disproportionation to tetra-secondary alkylbenzene. By the use of added benzene it is possible to operate at temperatures as high as +50° C., without substantial disproportionation.

PRODUCT RECOVERY

The reaction product mixture may be recovered from the acid phase by various methods. Probably the simplest procedure and one most suitable for laboratory work consists of adding the acid phase to crushed ice; or the acid phase may be contacted with cold aqueous alkaline solution, such as sodium hydroxide, potassium hydroxide and ammonia. It is desirable to prevent rearrangement reactions by the use of a cold aqueous reagent.

The hydrocarbons originally present in the acid phase appear as an upper oil layer above a lower aqueous layer. The upper oil layer may be separated by decantation and may be treated with dilute aqueous alkaline solution to remove any remaining HF and $BF_3$ occluded therein.

Both HF and $BF_3$ are relatively expensive chemicals and it is desirable in an economic process to recover these and to recycle them for reuse in the process. The HF and the $BF_3$ may be readily removed from the acid phase by heating the acid phase or by applying a vacuum thereto. The HF and the $BF_3$ distill overhead and may be recovered for reuse in the process. When di-alkylbenzenes and/or tri-alkylbenzenes are the principal complex-forming hydrocarbons, the complex may be decomposed at relatively low temperatures by the use of vacuum distillation. The tetraalkylbenzene and higher alkylbenzene complexes are stable and must be heated to relatively high temperatures, for example, 150° C. or more in order to decompose the complex.

The rearrangement reaction proceeds from the time that the complex is formed until the complex is decomposed, assuming that a suitable temperature exists. When it is desired to produce essentially only one rearrangement reaction product, for example, meta di-isopropylbenzene from para di-isopropylbenzene, or meta-di-isopropylbenzene from isopropylbenzene, it is necessary to take into account the total time elapsing from the time that the complex has been formed till the time that it has been decomposed in the distillative decomposition procedure. Thus, when using distillative decomposition procedure, it is necessary to consider the residence time of the complex in the decomposing zone as a part of the contacting time. Also, it is necessary to consider the temperature maintained in the decomposing zone when a particular product or a particular ratio of products is desired. Generally the temperature in the decomposing zone should be no higher than that in the contacting zone, when operating to produce meta di-secondary alkylbenzene. The distillative decomposing zone may be operated at temperatures as low as about —20° C. by the use of high vacuum therein.

The tri-secondary alkylbenzene at moderate temperatures disproportionates very slowly to the tetra-secondary alkylbenzene. Therefore it is possible to distillatively decompose the complex of tri-secondary alkylbenzene at temperatures as high as 40 or 50° C. if the acid phase is very rapidly raised to that temperature from the reaction temperature and the HF and $BF_3$ are very quickly removed from the heated acid phase.

Thus the recovery of the meta di-secondary alkylbenzene product without back isomerization to ortho and para isomers or disproportionation to the tri-secondary alkylbenzene is the most difficult recovery to be made by distillative decomposition of the complex. It is obvious that operation at very low temperatures such as —10° C. or lower involves an expensive high vacuum operation since liquid HF boils at +20° C. at atmospheric pressure.

The preferred method of recovering high purity meta di-secondary alkylbenzene from an acid phase without back isomerization or disproportionation is the displacement of the meta di-secondary alkylbenzene from its HF and $BF_3$ complex by an alkylbenzene which forms a more stable HF and $BF_3$ complex. Broadly, the displacer is a polyalkylbenzene containing at least three alkyl groups which alkyl groups are selected from the class consisting of normal and secondary and which contain not more than 4 carbon atoms. Normal alkyl groups are methyl, ethyl, n-propyl and n-butyl. The secondary alkyl groups are isopropyl and secondary butyl.

Pentamethylbenzene and hexamethylbenzene are particularly effective displacers. However, the complexes formed by these compounds are so stable that quite elevated temperatures are necessary to decompose the complexes in order to recover the HF and $BF_3$. Therefore, where economy is desirable, these compounds should not be used as displacers.

The preferred tri-alkylbenzenes have the symmetrical configuration, i. e., 1,3,5-tri-alkylbenzene. The preferred tetra-alkylbenzenes possess the 1,2,3,5 configuration. These displacers are preferred because they do not tend to undergo rearrangement reactions and have better displacement effectiveness than the other isomers. The preferred displacers are mesitylene, triethylbenzene, tri-isopropylbenzene, di-isopropyltoluene and isodurene.

As it is normally impractical to operate under conditions wherein absolutely no tri-secondary alkylbenzene is produced, it is desirable to operate with a displacer which will not complicate the problem of recovering the by-product, tri-secondary alkylbenzene. Therefore it is preferred to use as the displacer in the process of this invention a poly-secondary alkylbenzene, for example, tri-isopropylbenzene, or tri-secondary butylbenzene, corresponding to the alkyl group charged.

Theoretically, 1 mole of added displacer will replace 1 mole of di-secondary alkylbenzene. However, greater amounts of displacer should be used. The amount of displacer used is dependent upon the total recovery of di-secondary alkylbenzene desired and also the effectiveness of the contacting of the acid phase and the displacer. It is preferred to operate with between about 2 and 4 moles of displacer per mole of di-secondary alkylbenzene in the acid phase.

It has been pointed out that the acid phase possesses an extremely high solubility for aromatic hydrocarbons. Quite a large amount of displacer can be added to the acid phase without apparently displacing any di-secondary alkylbenzene. By the use of very large amounts of displacer, it is possible to produce a second liquid phase which comprises displaced di-secondary alkylbenzene and displacer.

Since paraffinic hydrocarbons are soluble in the acid phase to only a relatively small extent, it is possible to wash from the acid phase-displacer solution the displaced secondary alkylbenzene. The wash hydrocarbon must be inert to the action of HF and $BF_3$ and non-reactive with the alkylbenzenes present in the acid phase. Benzene may be used as a wash hydrocarbon. It is preferred to use as the inert hydrocarbon a low boiling liquid paraffin such as propane, butane, pentane and hexane.

The wash hydrocarbon may be introduced into the acid phase-displacer solution simultaneously with the displacer, preferably as a single solution; or the wash hydrocarbon may be introduced into the acid phase after the addition of the displacer. In order to avoid rearrangement reactions, it is preferred to introduce the wash hydrocarbon substantially simultaneously after the introduction of the displacer.

It is preferred to carry out the displacement operation in a continuous countercurrent tower; in such an operation, the acid phase is introduced in an upper portion of the tower, the displacer is introduced at a lower portion of the tower and the inert wash hydrocarbon is introduced at a point of the tower below the point of entry of the displacer.

The amount of inert wash hydrocarbon introduced must be enough to remove substantially all the displaced di-secondary alkylbenzene. In general, the amount of inert wash hydrocarbon used is between about 50 and 500 volume percent based on di-secondary alkylbenzene displaced, preferably between about 100 and 250 volume percent.

In order to avoid rearrangement reactions, the displacing zone should be operated at a temperature and for a contacting time such that essentially no rearrangement reactions take place therein. Thus, the contacting time in the displacing zone and the temperature therein must be considered in determining the total contacting time to be utilized in the process.

*Examples*

The results obtainable by the invention are illustrated by several examples set out below. The runs were carried out using a carbon steel reactor provided with a 1725 R. P. M. stirrer. The order of addition of materials to the reactor was: (1) cumene or sec-butylbenzene of C. P. quality (2) commercial grade anhydrous liquid HF and (3) commercial grade $BF_3$. The contents of the reactor were agitated during the addition of the HF and $BF_3$; the agitation was continued while the reactor was brought to the desired contacting temperature and maintained during the contacting time. All the runs were carried out under conditions such that only one liquid phase was present in the reactor at the completion of the run. The contents of the reactor were withdrawn into a vessel filled with crushed ice. An upper aqueous hydrocarbon layer formed above a lower aqueous layer. The hydrocarbon layer was decanted and washed with dilute ammonium hydroxide solution to remove HF and $BF_3$. The neutral hydrocarbons were water washed to remove traces of ammonium hydroxide.

The hydrocarbons recovered from the reactor were fractionated in a laboratory distillation column provided with about 30 theoretical plates. Each product fraction was analyzed by a combination of boiling point, specific gravity, refractive index, and ultraviolet and infrared technique.

The results of these runs are set out in Table I.

TABLE I

| Run No. | 1 | 2 | 3 | 4 | 5 | 6 | 7 |
|---|---|---|---|---|---|---|---|
| Charge: | | | | | | | |
| Cumene, moles | 5.1 | 2.5 | 2.5 | 2.5 | 2.5 | 2.5 | |
| Sec-butylbenzene, moles | | | | | | | 1.5 |
| HF/sec-alkylbenzene, mole ratio | 10.8 | 13.8 | 13.8 | 13.8 | 14.0 | 14.0 | 13.4 |
| $BF_3$/sec-alkylbenzene, mole ratio | 0.9 | 1.14 | 1.08 | 1.45 | 1.14 | 1.14 | 1.35 |
| Temperature, °C | +100 | +51 | +14 | −20 | −5 | −5 | +7 |
| Time, Minutes | 10 | 30 | 30 | 30 | 5 | 30 | 30 |
| Reaction Product Mixture, mole Percent:[a] | | | | | | | |
| Benzene | | 58.0 | 53.3 | 47.5 | 47 | 48.1 | 54.0 |
| Cumene | | 6.3 | 6.7 | 5.0 | 6 | 6.2 | |
| Sec-butylbenzene | | | | | | | 6.2 |
| m-di-sec-alkylbenzene | | 13.0 | 26.7 | 47.3 | 47 | 42.3 | 25.4 |
| other di-sec-alkylbenzene isomers | | 0.3 | 0.1 | 0.2 | 0 | 0 | 0 |
| 1,3,5-tri-sec-alkylbenzene | | 22.4 | 13.2 | 0 | 0 | 2.5 | 14.3 |
| other tri-sec-alkylbenzene isomers | | 0 | 0 | 0 | 0 | 0 | 0 |
| Higher boiling material | | 0 | 0 | 0 | 0 | 0 | 0 |
| Sec-alkylbenzene conversion, percent | 95 | 94 | 93 | 95 | 94 | 94 | 94 |
| Portion going to di-derivative | | 28 | 57 | 100 | 100 | 92 | 56 |
| Portion going to tri-derivative | | 72 | 43 | 0 | 0 | 8 | 44 |

[a] Weight basis: Propane, ca 5%; benzene, 48%; cumene, 5%; 198–218° C., 14%; 218°–253° C., 14%; and tar, 15%.

Run 1 shows that cumene is almost completely converted at +100° C. to a wide boiling range liquid product as well as large amounts of tar, probably condensed ring compounds, and gas.

Run 2, which was similar to run 1 in HF and BF₃ usage, shows that at +51° C. the cumene disproportionated smoothly to form essentially pure meta di-isopropylbenzene and 1,3,5-tri-isopropylbenzene. (In runs 2–7, the tri-derivative was, within the error of the infrared method, the pure 1,3,5-isomer.) The long contacting time of 30 minutes at this temperature produced a product containing about 2 moles of the tri-derivative per mole of the di-derivative.

Run 3, which is like run 2 except for a lower temperature of +14° C., gave a product wherein the ratio of di- to tri-derivatives is about 2, i. e., just the reverse of the distribution of run 2.

Run 4 was carried out at −20° C. and shows that, even with a 30 minute time, at this temperature no tri-derivative was formed. The di-derivative was virtually pure meta di-isopropylbenzene.

Runs 5 and 6 were carried out to show the influence of time, at constant temperature, on the product distribution. In run 5, no tri-derivative was found, at a 5 minute contact time at −5° C. contacting temperature. However, the 30 minute time in run 6 gave a significant yield of the tri-derivative. These runs indicate the need for coordinating both temperature and time in carrying out the process.

Run 7 was carried out with sec-butylbenzene. The product distribution in this run is substantially the same as the cumene in run 3. Infrared analysis of the tri-derivative indicated it to have the 1,3,5 orientation. This new compound 1,3,5-tri-secondary butylbenzene has the following physical characteristics:

Boiling point, ° C _____ 281 (760 mm.)
$n_D^{20}$ _____ 1.4825
$d^{20}$ _____ 0.853

This application is a division of our copending application, Serial Number 389,328, filed October 30, 1953, now Patent No. 2,852,575.

Thus having described the invention, what is claimed is:

1. An isomerization process which comprises (1) contacting, under substantially anhydrous conditions and in the substantial absence of reactive hydrocarbons, poly-secondary alkylbenzene containing at least 2 secondary alkyl groups, which groups are selected from the class consisting of isopropyl and secondary butyl, with (a) (i) at least sufficient liquid HF to form a distinct acid phase and (a) (ii) with at least one mole of BF₃ per mole of poly-secondary alkylbenzene charged, at a temperature at set out in the annexed schedule for a time such that the poly-secondary alkylbenzene charged is isomerized substantially to the meta-oriented isomer and substantially no disproportionation reactions occur, and (2) removing HF and BF₃ under conditions to substantially avoid rearrangement reactions and (3) recovering from the hydrocarbon reaction product a poly-secondary alkylbenzene fraction comprising substantially the meta-oriented isomer of the poly-secondary alkylbenzene charged, wherein the relationship of the type of poly-secondary alkylbenzene charged and the temperature of contacting is set out in the annexed schedule:

Poly-secondary alkylbenzene charged: Temperature, ° C.
I. Ortho di-, para di-, mixtures thereof, and mixtures of meta di- and a substantial amount of at least one other isomer of di- _____ lower than −30
II. A mixture of I and at least a substantial amount of benzene _____ −30 to −5
III. A tri-isomer other than the 1,3,5-tri-isomer and mixtures of the 1,3,5-tri-isomer and a substantial amount of at least one other isomer of tri- _____ 0 to +30

2. An isomerization process which comprises contacting, under substantially anhydrous conditions and in the substantial absence of reactive hydrocarbons, a di-secondary alkylbenzene selected from the class consisting of the ortho isomer, the para isomer, mixtures thereof and mixtures of the meta isomer and a substantial amount of at least one other isomer of di-isopropylbenzene and di-secondary butylbenzene, with at least 1 mole of BF₃ per mole of di-secondary alkylbenzene charged and at least sufficient liquid HF to form a distinct acid phase, at a temperature of not more than about −30° C. for a time of not more than about 30 minutes, wherein the lower the temperature of contacting the longer the permissible time of contacting, and removing HF and BF₃ from said acid phase under conditions to substantially avoid rearrangement reactions and recovering from the reaction product a di-secondary alkylbenzene fraction comprising substantially the meta isomer.

3. The process of claim 2 wherein the temperature is about −30° C. and the time is not more than about 5 minutes and said reaction product contains essentially no poly-secondary alkylbenzene.

4. The process of claim 2 wherein said secondary alkylbenzene is para-di-isopropylbenzene.

5. An isomerization process which comprises contacting, under substantially anhydrous conditions, a charge comprising essentially (i) at least a substantial amount of benzene and (ii) only one di-secondary alkylbenzene selected from the class consisting of the ortho isomer, the para isomer, mixtures thereof and mixtures of the meta isomer and a substantial amount of at least one other isomer of di-isopropylbenzene and di-secondary butylbenzene, with at least 1 mole of BF₃ per mole of secondary alkylbenzene charged and at least sufficient liquid HF to form a distinct acid phase, at a temperature between about −30° C. and about −5° C. for a time at least sufficient to isomerize said secondary alkylbenzene essentially to the meta isomer but not long enough to form appreciable amounts of disproportionation product, and removing HF and BF₃ from said acid phase under conditions to essentially avoid disproportionation reactions and recovering a di-secondary alkylbenzene fraction consisting essentially of the meta isomer.

6. The process of claim 5 wherein the amount of benzene in said charge is between about 1 mole per mole of di-secondary alkylbenzene and the limit of solubility in said acid phase.

7. The process of claim 5 wherein the maximum time of contacting is between about 5 minutes at −5° C. and about 2 hours at −20° C., the longer times corresponding to the lower temperatures.

8. The process of claim 5 wherein said acid phase is contacted with at least about 1 mole of a displacer per mole of secondary alkylbenzene present in said acid phase and substantially simultaneously thereafter with an amount of an inert liquid hydrocarbon sufficient to extract from said acid phase displaced secondary-alkylbenzene, under conditions of temperature and time such that substantially no rearrangement reaction takes place, and separating a separate raffinate phase comprising inert hydrocarbon and secondary alkylbenzene from an acid phase comprising HF, BF₃, displacer and some secondary alkylbenzene, and recovering from said raffinate phase a secondary alkylbenzene comprising essentially the meta isomer, and wherein said displacer is a poly-alkylbenzene containing at least 3 alkyl groups that are selected from the class consisting of normal and secondary, which contain not more than 4 carbon atoms.

9. The process of claim 8 wherein said inert hydrocarbon is present in an amount between about 50 and 500 volume percent based on secondary alkylbenzene in said acid phase.

10. An isomerization process which comprises contacting, under substantially anhydrous conditions and in the substantial absence of reactive hydrocarbons, a tri-secondary alkylbenzene selected from the class consisting of an isomer other than the 1,3,5-isomer and mixtures of the 1,3,5-isomer and a substantial amount of at least one other isomer of tri-isopropylbenzene and tri-secondary butylbenzene, with at least 1 mole of $BF_3$ per mole of tri-secondary alkylbenzene charged and at least sufficient liquid HF to form a distinct acid phase, at a temperature of between about 0° and +30° C. for a time sufficiently short to substantially avoid disproportionation reactions, and removing HF and $BF_3$ from said acid phase under conditions to substantially avoid rearrangement reactions and recovering from the reaction product a tri-secondary alkylbenzene fraction comprising substantially the 1,3,5-isomer.

11. The process of claim 10 wherein said charge consists essentially of at least one isomer of tri-isopropylbenzene other than the 1,3,5-isomer.

References Cited in the file of this patent

UNITED STATES PATENTS 2,741,647   McCaulay et al. _____ Apr. 10, 1956

OTHER REFERENCES

Siderova et al.: Zhur. Obshchei Khim. (J. Gen. Chem.), vol. 19, pages 337–41 (1949); abstracted in Chem. Abstracts, vol. 43, 6582–3 (1949).